US012255992B2

(12) United States Patent
Li

(10) Patent No.: US 12,255,992 B2
(45) Date of Patent: Mar. 18, 2025

(54) SYSTEM AND METHOD FOR DECRYPTING ENCRYPTED SECRET DATA ITEMS WITHOUT MASTER PASSWORD

(71) Applicant: Blue Space Information Technology Co., Ltd.

(72) Inventor: Wei Li, Guangzhou (CN)

( * ) Notice: Subject to any disclaimer, the term of this patent is extended or adjusted under 35 U.S.C. 154(b) by 291 days.

(21) Appl. No.: 17/901,164

(22) Filed: Sep. 1, 2022

(65) Prior Publication Data

US 2024/0080189 A1  Mar. 7, 2024

(51) Int. Cl.
G06F 21/00 (2013.01)
H04L 9/06 (2006.01)
H04L 9/08 (2006.01)
H04L 9/14 (2006.01)

(52) U.S. Cl.
CPC .......... H04L 9/0863 (2013.01); H04L 9/0631 (2013.01); H04L 9/0894 (2013.01); H04L 9/14 (2013.01)

(58) Field of Classification Search
CPC ... H04L 9/0863; H04L 9/0631; H04L 9/0894; H04L 9/14; H04L 9/0825; H04L 9/0822
See application file for complete search history.

(56) References Cited

U.S. PATENT DOCUMENTS

| | | | |
|---|---|---|---|
| 9,172,532 B1* | 10/2015 | Fuller | H04L 9/0822 |
| 2015/0172046 A1* | 6/2015 | Reilly | H04L 9/088 |
| | | | 713/182 |
| 2020/0195621 A1* | 6/2020 | Li | H04L 9/3226 |
| 2020/0389302 A1* | 12/2020 | Canard | H04L 9/3226 |

OTHER PUBLICATIONS

"Decrypt passwords/cookies/history/bookmarks from the browser", GitHub, Inc., https://github.com/moonD4rk/HackBrowserData.
Help Center Emergency Access, bitwarden, https://bitwarden.com/help/emergency-access/, Aug. 17, 2022.

* cited by examiner

*Primary Examiner* — Michael M Lee
(74) *Attorney, Agent, or Firm* — The Law Offices of Konrad Sherinian LLC; Depeng Bi

(57) ABSTRACT

An improved password manager runs on an electronic communication device. It derives an encryption key from a user master password and generates a master encryption key. The manager uses the encryption key to twice encrypt the master encryption key. It uses the mater encryption key to encrypt secret data items. The manager generates a second tier encryption key and uses it to twice encrypt the master encryption key. The encrypted data is stored. The second tier encryption key is encrypted using a hardware encryption element and shared with a trusted password manager. When the master password becomes unavailable, the manager requests the encrypted second tier encryption key is requested from the trusted manager. Once the master encryption password is recovered, it is used to decrypt the encrypted secret data items.

19 Claims, 11 Drawing Sheets

SYSTEM AND METHOD FOR DECRYPTING ENCRYPTED SECRET DATA ITEMS WITHOUT MASTER PASSWORD

CROSS REFERENCE TO RELATED APPLICATIONS

This patent application is related to a U.S. patent application Ser. No. 17/701,792, entitled "SYSTEM AND METHOD FOR PROTECTING SECRET DATA ITEMS USING MULTIPLE TIERS OF ENCRYPTION AND SECURE ELEMENT," filed Mar. 23, 2022, assigned to Blue Space Information Technology Co., Ltd., and which is hereby incorporated by reference.

FIELD OF THE DISCLOSURE

The present invention generally relates to confidential electronic data protection, and more particularly relates to a system and method for decrypting encrypted data without the master password by a password manager. More particularly still, the present disclosure relates to a system and method for decrypting encrypted data without the master password by a password manager while the security is not compromised.

DESCRIPTION OF BACKGROUND

Password managers are used to protect people's secret data items, such as personal passwords, passcodes, pin numbers, financial account access codes, time-based one-time passwords (TOTP), Uniform Resource Locators (URLs), online account login names, online account Email addresses, phone numbers, notes, etc. Password managers help users store and manage secret data items. Conventional password managers require a user to configure a master password to encrypt secret data items and decrypt the encrypted data items. The master password is the only password that the user uses for protecting the secret data items. A password manager is usually a computer software program or application. One type of password managers is integrated with a web browser.

The encryption process and principle of conventional password managers are further illustrated in FIG. 1. The master password is set by a particular user. Derive parameters are parameters for generating the encryption key from the master password. For example, when Password-Based Key Derivation Function 2 (PBKDF2) is used to derive the encryption key from the master password, the derive parameters include a salt value and a number of repetitions. PBKDF2 applies a pseudorandom function, such as hash-based message authentication code (HMAC), to the input password or passphrase along with the salt value and repeats the process many times to produce a derived encryption key. The encryption key is used to encrypt the user's data, which is also referred to herein as plaintext. The encrypted data is also referred to herein as ciphertext. Another input to the encryption process is the initialization vector (IV). Taking the block cipher Advanced Encryption Standard (AES) as an example, it uses an additional initialization vector for the encryption. The initialization vector is used to ensure that the same value encrypted multiple times, even with the same secret key, will not always result in the same encrypted value. It provides an added security layer in encryption. The derive parameters, the IV and the ciphertext, but not the master password, are written into a storage device by the password manager.

The decryption process of the ciphertext is further illustrated in FIG. 2. The derive parameters, IV and ciphertext are read from the storage device. The encryption key is derived from the master password and derive parameters. It is then used along with the IV to decrypt the ciphertext to retrieve the original plaintext.

For the sake of security, conventional password managers do not save the master password, and do not allow the user to reset one either. The encryption key is determined by the master password along with the derive parameters. Developers and providers of conventional password managers cannot control over the encryption key. However, when the user forgets about the master password, conventional password managers provide no solution to retrieve the plaintext, i.e., the user's secret data items, for the user. In such a case, the user loses all the secret data items.

Conventional password managers have tried to resolve this issue with two unsatisfactory solutions. With the first unsatisfactory solution, the encryption key is not derived from the master password, but controlled by providers of conventional password managers. The encryption key is stored in a cloud storage system. The master password is not used to encrypt data, but for user verification only. Such an approach significantly lowers the security level of password managers and the protection of user's secret data items. For example, when the cloud storage system is compromised by a hacker or a mole of the password manager provider, the user's secret data items can be stolen. As used herein, it is said that the security is compromised when the security level of the data protection is lowered.

With the second unsatisfactory solution, a conventional password manager allows the user to configure an emergency contact person, whose public key is used to encrypt the encryption key. The encrypted encryption key is then stored. When the user forgets her/his master password, the encrypted encryption key is then sent to the emergency contact person, who then uses a private key to decrypt the encrypted encryption key to obtain the encryption key. The encryption key is then used to decrypt the ciphertext to obtain the plaintext. Such an approach also significantly lowers the security level of password managers and the protection of the user's data because the emergency contact person has to be trustworthy and readily available.

Accordingly, there is a need for a new password manager that is capable of obtaining the plaintext from the ciphertext when the user forgets or otherwise loses her/his master password without lower or compromised data protection security.

SUMMARY OF THE DISCLOSURE

Generally speaking, pursuant to the various embodiments, the present disclosure provides a method for decrypting encrypted data without compromised security while a master password becomes unavailable. The method is performed by a password manager running on an electronic communication device and includes retrieving a master password; deriving, using a key derivation function, an encryption key from the master password; generating a master encryption key; encrypting, using the encryption key and a first set of encryption parameters, the master encryption key to generate a first encrypted master encryption key; and encrypting, using a hardware encryption element of the electronic communication device and a second set of encryption parameters, the first encrypted master encryption key and the first set of encryption parameters to generate a second encrypted master encryption key. The electronic communication device includes a processing unit; some amount of memory operatively coupled to the processing unit; a network interface operatively coupled to the processing unit; a video output interface operatively coupled to the processing unit; a hardware security element operatively coupled to the processing unit; and a storage element operatively coupled to the processing unit. The method also includes storing the second encrypted master encryption key and the second set of encryption parameters; generating a second tier encryption key; encrypting, using the second tier encryption key and a third set of encryption parameters, the master encryption key to generate a third encrypted master encryption key; encrypting, using the hardware encryption element and a fourth set of encryption parameters, the third encrypted master encryption key to generate a fourth encrypted master encryption key; storing, the fourth encrypted master encryption key and the fourth set of encryption parameters; encrypting, using the hardware encryption element and a fifth set of encryption parameters, the second tier encryption key to generate a first encrypted second tier encryption key; encrypting, using a pre-shared encryption key and a sixth set of encryption parameters, the first encrypted second tier encryption key and the fifth set of encryption parameters to generate a second encrypted second tier encryption key; sending the second encrypted second tier encryption key and the sixth set of encryption parameters to a trusted password manager running on a second electronic communication device over a network; requesting the first encrypted second tier encryption key and the fifth set of encryption parameters from the trusted password manager; receiving the first encrypted second tier encryption key and the fifth set of encryption parameters from the trusted password manager; decrypting, using the hardware encryption element and the fifth set of encryption parameters, the first encrypted second tier encryption key to retrieve the second tier encryption key; retrieving the fourth encrypted master encryption key and the fourth set of encryption parameters; decrypting, using the hardware encryption element and the fourth set of encryption parameters, the fourth encrypted master encryption key to retrieve the third encrypted master encryption key and the third set of encryption parameters; decrypting, using the second tier encryption key and the third set of encryption parameters, the third encrypted master encryption key to retrieve the master encryption key; and decrypting, using the master encryption key, encrypted secret data items to retrieve the secret data items. In one implementation, the key derivation function is a Password-Based Key Derivation Function 2 function; the encryption key is an Advanced Encryption Standard (AES) 128-bit key, an AES 192-bit key or an AES 256-bit key; the master encryption key is an AES 128-bit key, an AES 192-bit key or an AES 256-bit key; and the hardware encryption element is a Secure Element. In one implementation, the first set of encryption parameters includes an initialization vector; the second set of encryption parameters includes an initialization vector; the third set of encryption parameters includes an initialization vector; the fourth set of encryption parameters includes an initialization vector; the fifth set of encryption parameters includes an initialization vector; and the sixth set of encryption parameters includes an initialization vector. In one implementation, the second encrypted master encryption key, the second set of encryption parameters, the fourth encrypted master encryption key and the fourth set of encryption parameters are stored into the storage element. In one implementation, the method also includes comprising generating a new master encryption key. In one implementation, the method also includes comprising causing a new master password generated. In one implementation, the method also includes sending the second encrypted second tier encryption key and the sixth set of encryption parameters to a second trusted password manager running on a third electronic communication device over a network; and requesting the first encrypted second tier encryption key and the fifth set of encryption parameters from the second trusted password manager. In one implementation, the method also includes receiving the first encrypted second tier encryption key and the fifth set of encryption parameters from the second trusted password manager.

BRIEF DESCRIPTION OF THE DRAWINGS

Although the characteristic features of this disclosure will be particularly pointed out in the claims, the invention itself, and the manner in which it may be made and used, may be better understood by referring to the following description taken in connection with the accompanying drawings forming a part hereof, wherein like reference numerals refer to like parts throughout the several views and in which:

A person of ordinary skills in the art will appreciate that elements of the figures above are illustrated for simplicity and clarity, and are not necessarily drawn to scale. The dimensions of some elements in the figures may have been exaggerated relative to other elements to help understanding of the present teachings. Furthermore, a particular order in which certain elements, parts, components, modules, steps, actions, events and/or processes are described or illustrated may not be actually required. A person of ordinary skill in the art will appreciate that, for the purpose of simplicity and clarity of illustration, some commonly known and well-understood elements that are useful and/or necessary in a commercially feasible embodiment may not be depicted in order to provide a clear view of various embodiments in accordance with the present teachings.

DETAILED DESCRIPTION

Figure 1:
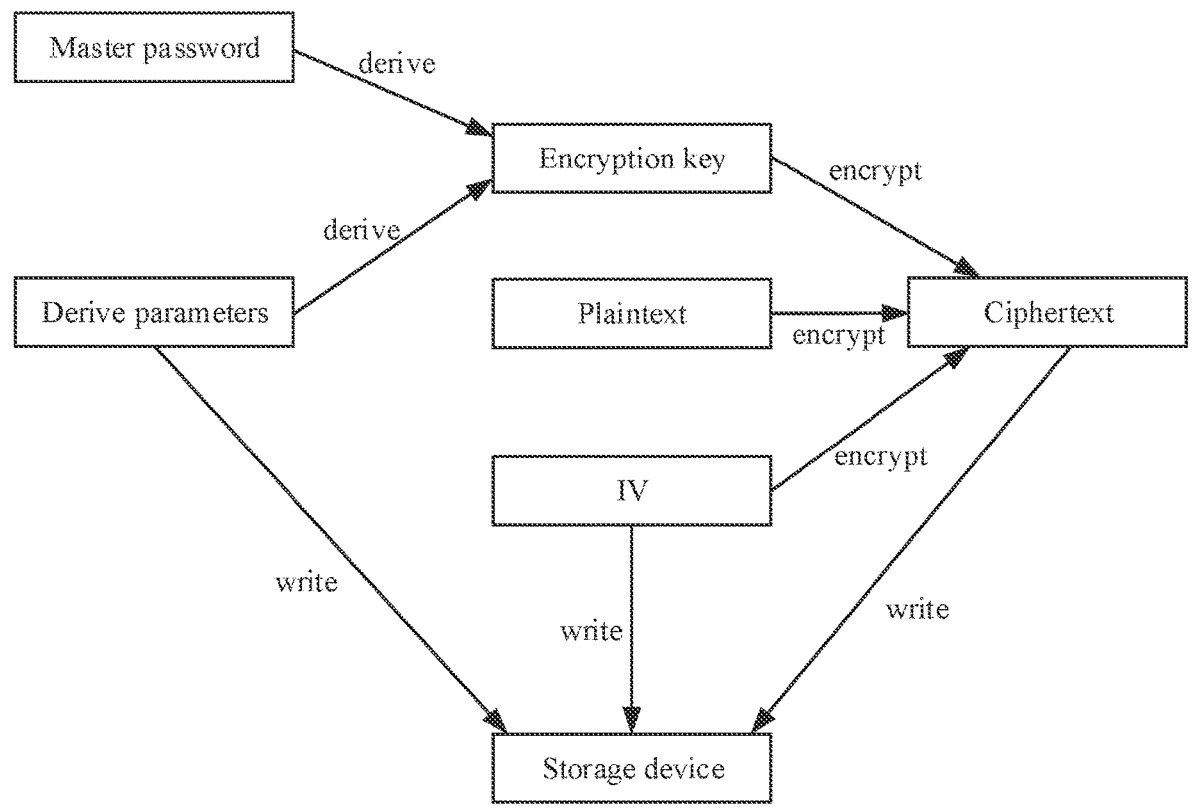
FIG. 1 is a flowchart illustrating a process by which a conventional password manager encrypts data.
Figure 2:
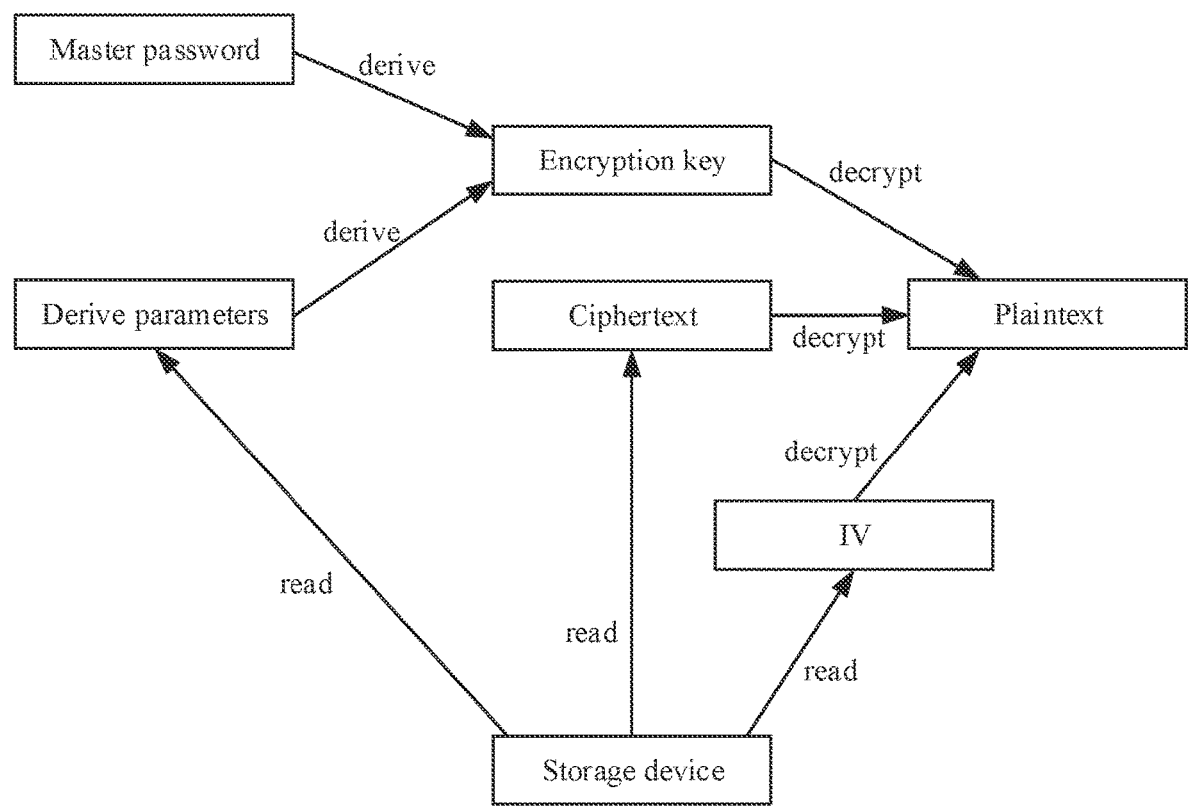
FIG. 2 is a flowchart illustrating a process by which a conventional password manager decrypts encrypted data to obtain plaintext.
Figure 3:
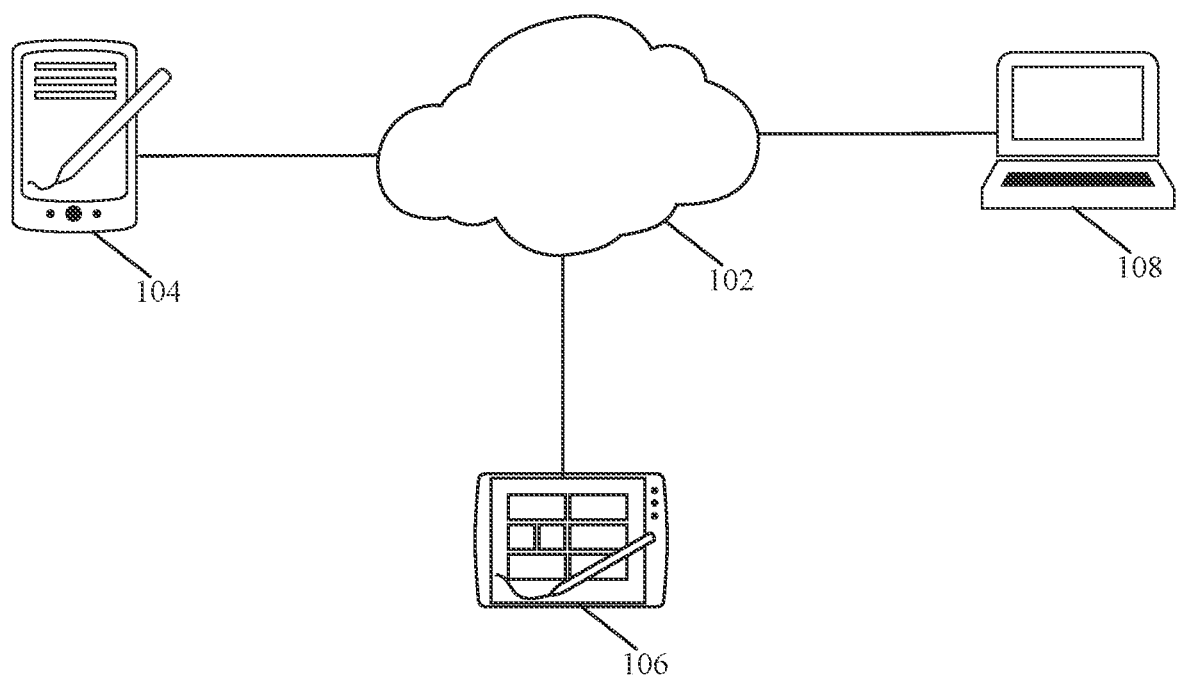
FIG. 3 is a block diagram illustrating a communication system over a network in accordance with this disclosure.
Figure 4:
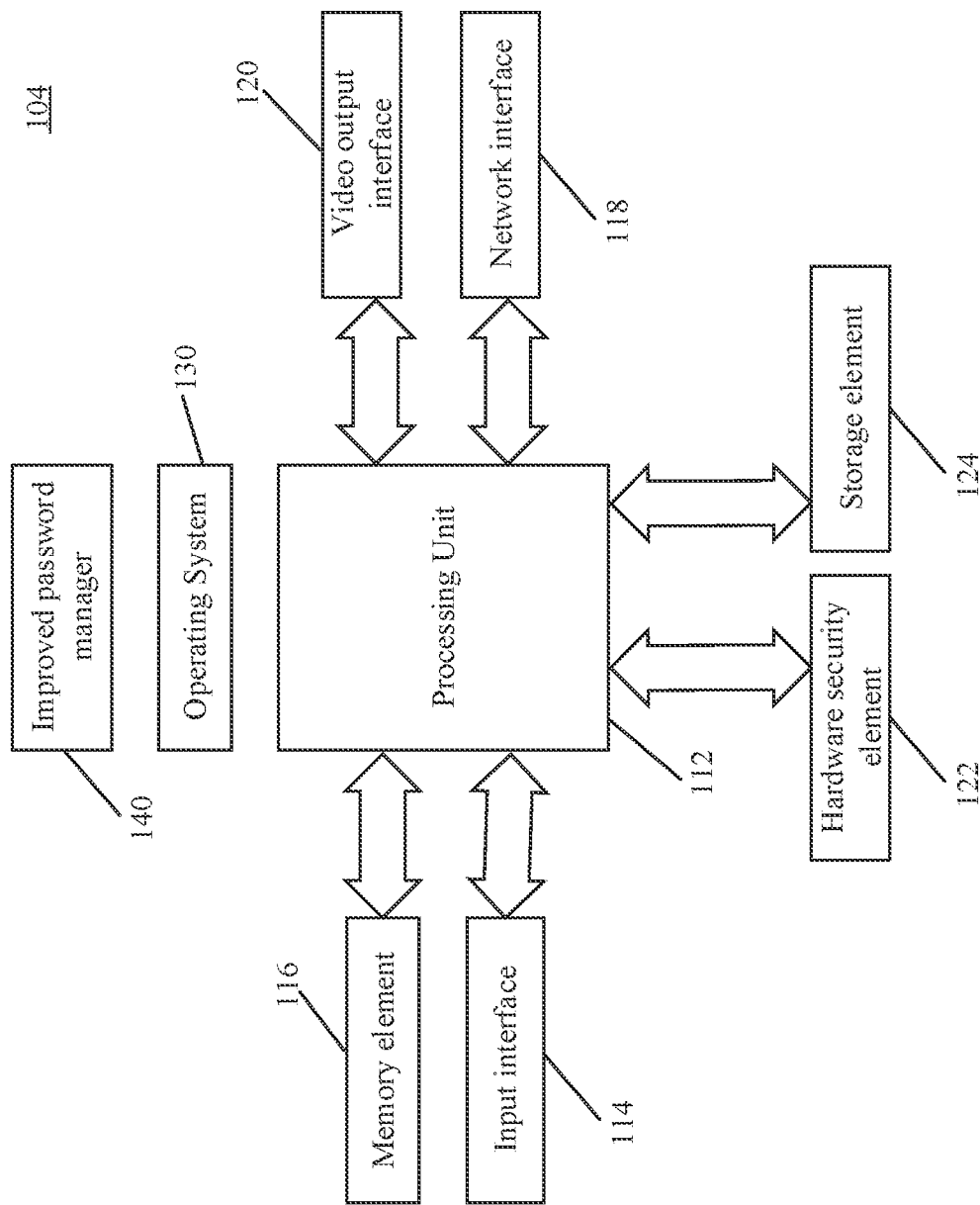
FIG. 4 is a block diagram illustrating an electronic communication device in accordance with this disclosure.

Turning to the Figures and to FIGS. 3 and 4 in particular, a flowchart illustrating a communication system over a network is shown and generally indicated at 100. The communication system 100 includes a plurality of electronic communication devices, such as those indicated 104, 106 and 108. The electronic communication devices 104-108 communicate with each other over a network 102, such as the Internet. The electronic communication devices 104-108 access the network 102 via a network link, such as Wi-Fi networks, public cellular phone networks, Ethernet networks, etc. Taking the electronic device 104 as an example, the electronic communication devices 104-108 are further illustrated in FIG. 4.

Figure 11:
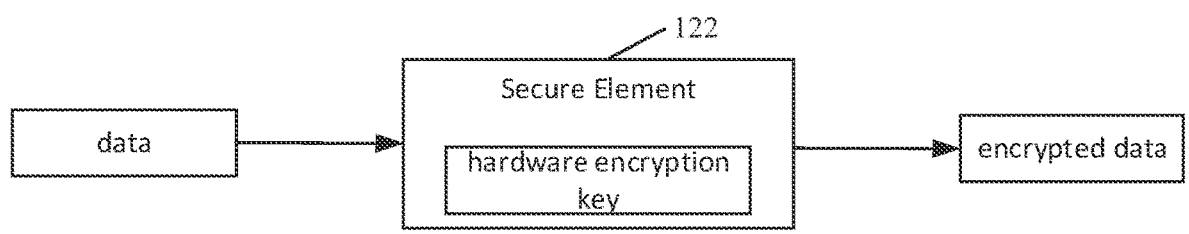
FIG. 11 is a block diagram illustrating a hardware encryption element.

Turning now to FIG. 4, a simplified block diagram of the illustrative electronic device 104 (such as smartphones, tablet computers and laptop computers) with the new password manager is shown. The illustrative electronic device 104 includes a processing unit (such as a central processing unit (CPU)) 112, an input interface (such as a touch screen) 114 operatively coupled to the processing unit 112, some amount of memory 116 operatively coupled to the processing unit 112, a network interface 118 operatively coupled to the processing unit 112 for accessing the network 102, a video output interface 120 operatively coupled to the processing unit 112, and a hardware security element (such as a Secure Element) 122 operatively coupled to the processing unit 112. A Secure Element (SE) is a microprocessor chip for prohibiting unauthorized access and storing secret data items, such as confidential and cryptographic data. It has been utilized in smartphones, tablet computers, hardware crypto wallets, and other electronic devices. As shown in FIG. 11, a Secure Element uses a hardware encryption key to encrypt data (also referred to herein as plaintext) into cipher text (i.e., encrypted data) within the hardware chip.

The electronic communication device 104 also includes an operating system 130 (such as an Android operating system or an iOS operating system) running on the processing unit 112, and an improved password manager 140 adapted to be executed by the processing unit 112. The password manager 140 is a specialized computer software application programmed using computer programing languages (such as C, C++, Java, etc.).

The new password manager 140 does not directly use a master password, which is set by and for a user, to encrypt the user's secret data items. Instead, it generates master encryption key for encrypting the secret data items. The master encryption key is encrypted by an encryption key derived from the master password. When the user forgets or otherwise loses the master password, the new password manager 140 is still able to decrypt the encrypted secret data items to recover the secret data items. The process by which the new password manager 140 recovers the secret data items from the encrypted secret data items by decryption when the user loses the master password is further illustrated by reference to FIGS. 5 through 10.

Figure 5:
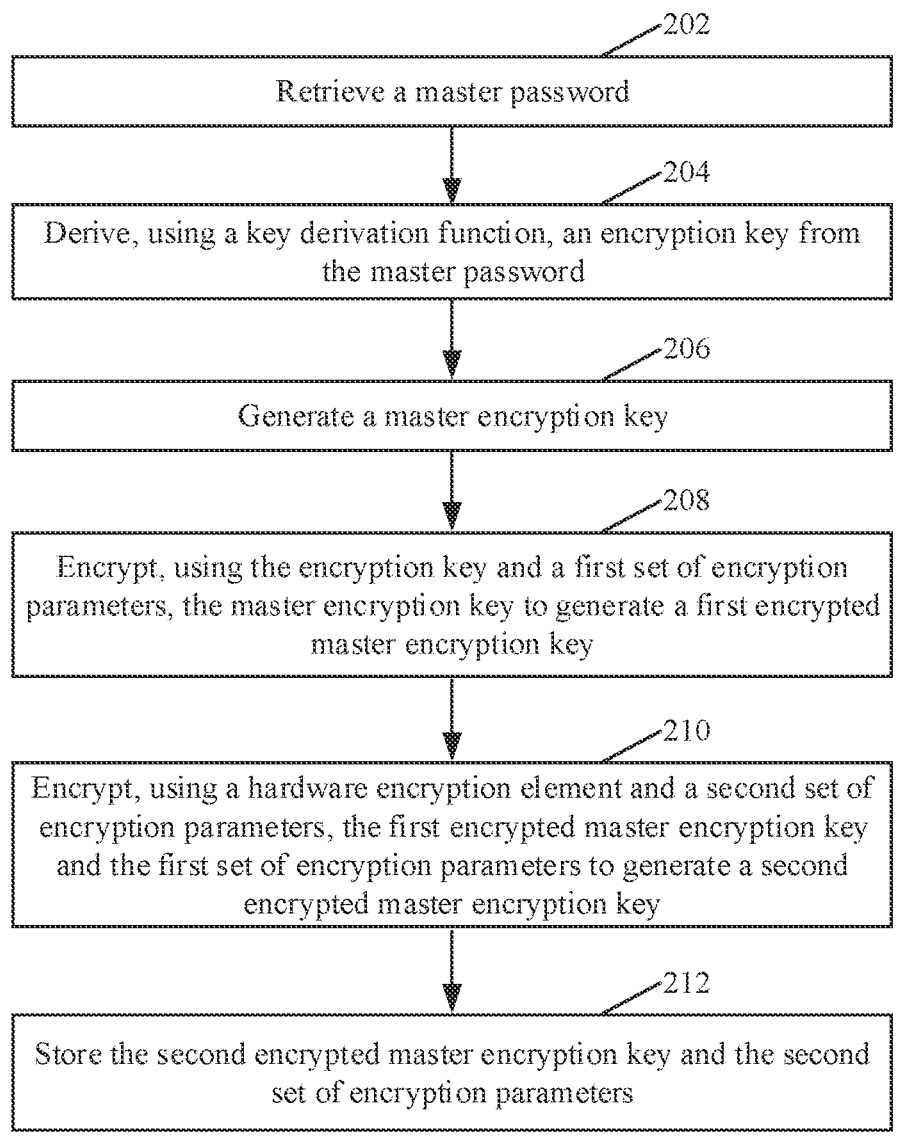
FIG. 5 is a flowchart illustrating a process by which an improved password manager encrypts secret data items using a master encryption key in accordance with this disclosure.

Referring first to FIG. 5, a flowchart illustrating a process by which the password manager 140 encrypts secret data items using a master encryption key, which is different from a user's master password, is shown and generally indicated at 200. At 202, the improved password manager 140 retrieves a master password of the user. The master password is the password that the user remembers or otherwise keeps for accessing her/his secret data items. The user sets the master password and keeps the same confidential. The password manager 140 obtains the master password from the user to protect and/or retrieve her/his secret data items (also referred to herein as plain secret data items before they are encrypted).

At 204, the password manager 140 derives, using a key derivation function with derivation parameters which are stored on setting up the master password, an encryption key from the master password. In one implementation, the key derivation function is a PBKDF2 function or an Argon2 function. The encryption key can be, for example, an AES 128-bit key, an AES 192-bit key or an AES 256-bit key. At 206, the improved password manager 140 generates a master encryption key, such as an AES 128-bit key, an AES 192-bit key or an AES 256-bit key. At 208, the improved password manager 140 uses the encryption key with a first set of encryption parameters to encrypt the master encryption key to generate a first encrypted master encryption key. For example, the first set of encryption parameters includes an IV for AES encryption. At 210, the improved password manager 140 encrypts, using the hardware encryption element 122 with a second set of encryption parameters, to encrypt the first encrypted master encryption key and the first set of encryption parameters into a second encrypted master encryption key. At 212, the improved password manager 140 stores the second encrypted master encryption key and the second set of encryption parameters. In one implementation, the second encrypted master encryption key and the second set of encryption parameters are stored in the storage element 124 of the electronic device (such as the device 104) running the password manager 140.

The improved password manager 140 uses the master encryption key to encrypt secret data items to generate encrypted secret data. The process to recover the plain secret data items from the encrypted secret data when the user still knows the master password is further illustrated by reference to FIG. 6.

Figure 6:
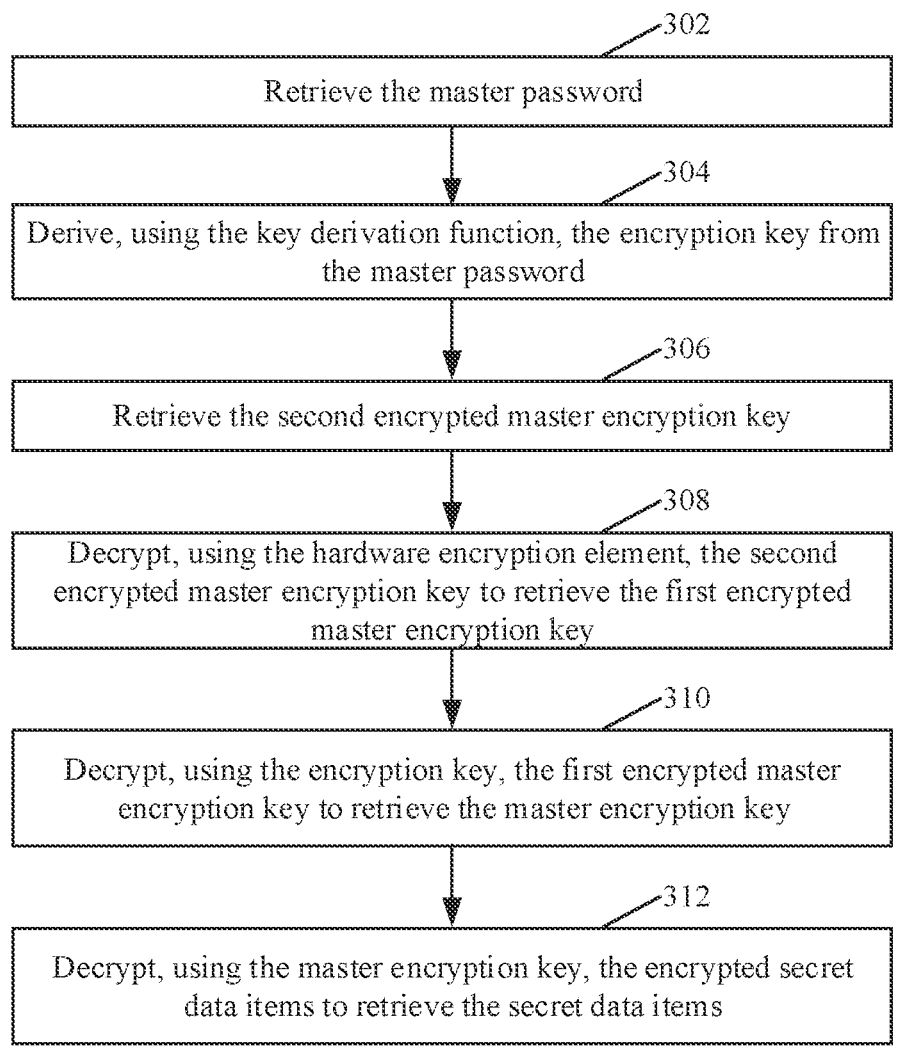
FIG. 6 is a flowchart illustrating a process by which an improved password manager decrypts encrypted data with a known master password in accordance with this disclosure.

Referring to FIG. 6, a flowchart illustrating the process by which the password manager 140 decrypts encrypted data when the master password is known, not forgot or lost, is shown and generally indicated at 300. At 302, the password manager 140 retrieves the master password. For example, at 302, the password manager 140 requests the user to enter the master password. At 304, the password manager 140 derives, using a key derivation function (such as a PBKDF2 function or an Argon2 function) with derivation parameters, the encryption key from the master password. At 304, the derive parameters used at 204 are retrieved from the storage element (such as a hard disk) of the device 104 and used to derive the encryption key at 304.

At 306, the password manager 140 retrieves the stored second encrypted master encryption key and the second set of encryption parameters from the storage element 124. At 308, the password manager 140 decrypts, using the Secure Element 122 and the second set of encryption parameters to decrypt the second encrypted master encryption key to retrieve the first encrypted master encryption key and the first set of encryption parameters. At 310, the password manager 140 decrypts, using the encryption key with the first set of encryption parameters to decrypt the first encrypted master encryption key to retrieve the master encryption key. At 312, the password manager 140 decrypts, using the master encryption key, the encrypted secret data to recover the plain secret data items of the user.

Conventional password managers cannot recover the plain secret data items from the encrypted secret data when the user loses the master password. Some conventional password managers provided certain solutions to this problem. However, the conventional solutions are achieved with compromised security. To resolve this problem without compromised security, the improved password manager 140 protects the master encryption key using a set (meaning one or more) of second tier encryption keys. The master encryption key protection is further illustrated by reference to FIG. 7.

Figure 7:
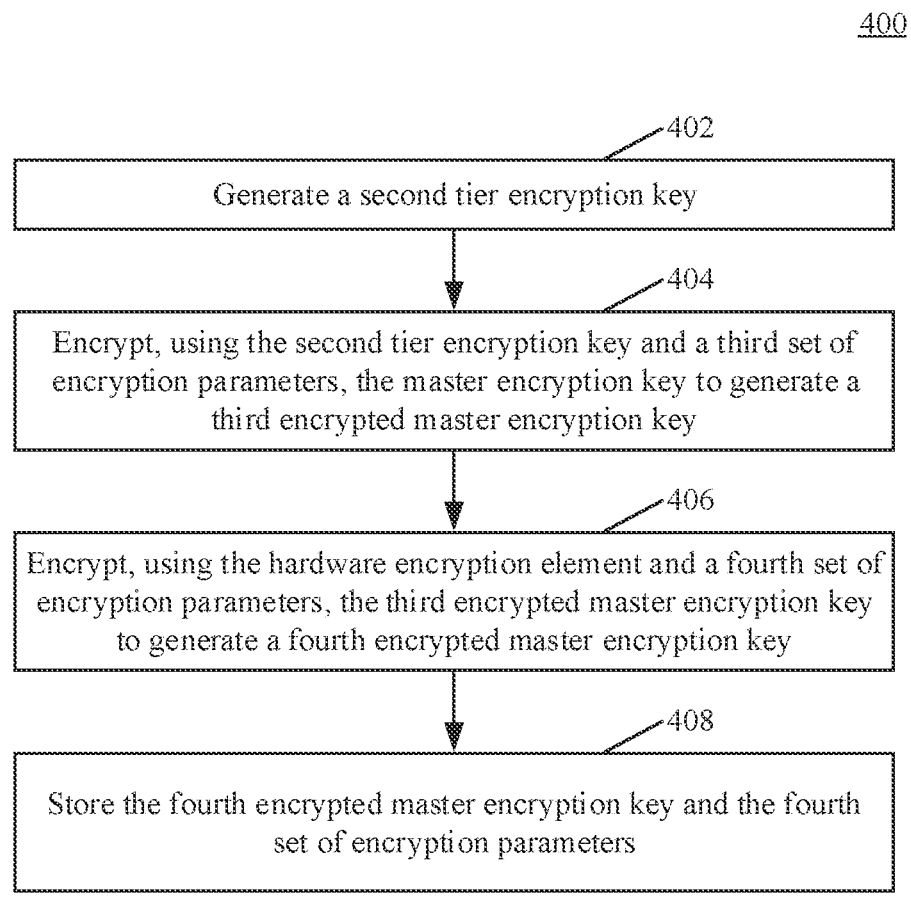
FIG. 7 is a flowchart illustrating a process by which an improved password manager protects a master encryption key in accordance with this disclosure.

Referring to FIG. 7, a flowchart illustrating a process by which the improved password manager 140 protects the master encryption key is shown and generally indicated at 400. At 402, the password manager 140 generates a second tier encryption key, such as an AES 128-bit key, an AES 192-bit key or an AES 256-bit key. At 404, the password manager 140 encrypts, using the second tier encryption key with a third set of encryption parameters, to encrypt the master encryption key to generate a third encrypted master encryption key. At 406, the password manager 140 encrypts, using the hardware security element 122 and a fourth set of encryption parameters, to encrypt the third encrypted master encryption key and the third set of encryption parameters to generate a fourth encrypted master encryption key. At 408, the improved password manager 140 stores the fourth encrypted master encryption key and the fourth set of encryption parameters in the storage of the electronic device 104. In one implementation, the fourth encrypted master encryption key is stored in the storage element 124 of the device 104. The storage element 124 is operatively coupled to the processing unit 112.

The improved password manager 140 does not store or otherwise keep the second tier encryption key. Instead, the improved password manager 140 encrypts the second tier encryption key and forwards the encrypted data to a trusted password manager over the network 102 for safeguarding. The safeguarding of the second tier encryption key is further illustrated by reference to FIG. 8.

Figure 8:
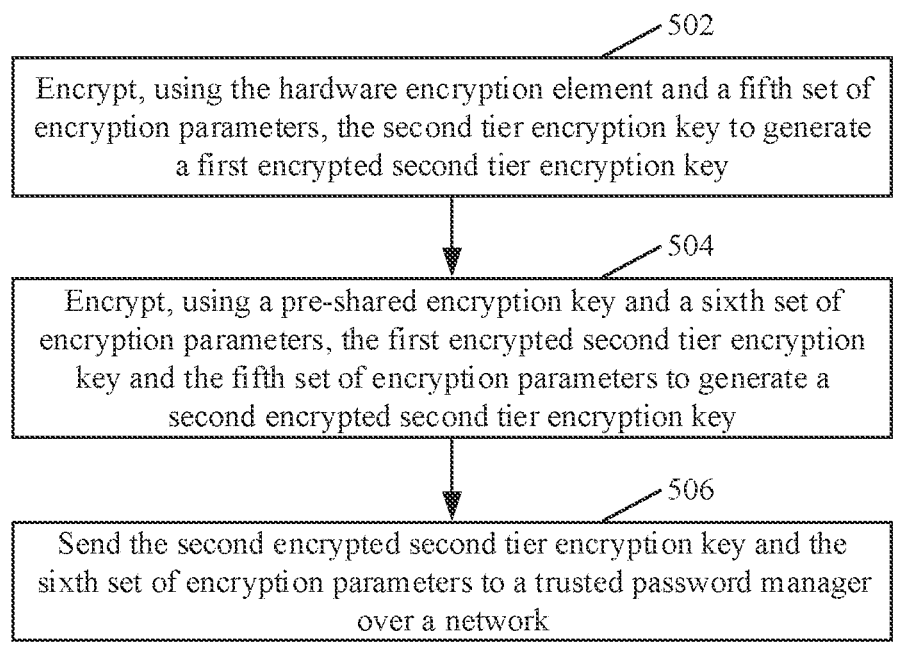
FIG. 8 is a flowchart illustrating a process by which an improved password manager protects a set of second tier encryption keys in accordance with this disclosure.

Referring to FIG. 8, a flowing charting illustrating the process by which the improved password manager 140 protects a set of second tier encryption keys is shown and generally indicated at 500. At 502, the improved password manager 140 encrypts, using the hardware encryption element 122 a fifth set of encryption parameters, to encrypt the second tier encryption key to generate a first encrypted second tier encryption key. At 504, the improved password manager 140 encrypts, using a pre-shared encryption key with a sixth set of encryption parameters, to encrypt the first encrypted second tier encryption key and the fifth set of encryption parameters to generate a second encrypted second tier encryption key. The pre-shared encryption key is an encryption key shared between the users of the device 104 and the device 106. At 506, the improved password manager 140 sends the second encrypted second tier encryption key with the sixth set of encryption parameters to a trusted password manager over the network 102. For example, the trusted password manager is the improved password manager 140 running on the electronic device 106. The improved password manager 140 running on the electronic communication device running on the device 106 receives the second encrypted second tier encryption key and stores it in a storage element of the device 106.

When the user loses her/his master password, the improved password manager 140 running on the device 104 requests the first encrypted second tier encryption key from the trusted password manager 140 running on the device 106 over the network 102. The process by which the trusted password manager 140 retrieves the first encrypted second tier encryption key and provides it to the password manager 140 running on the source device 104 is further illustrated by reference to FIG. 9.

Figure 9:
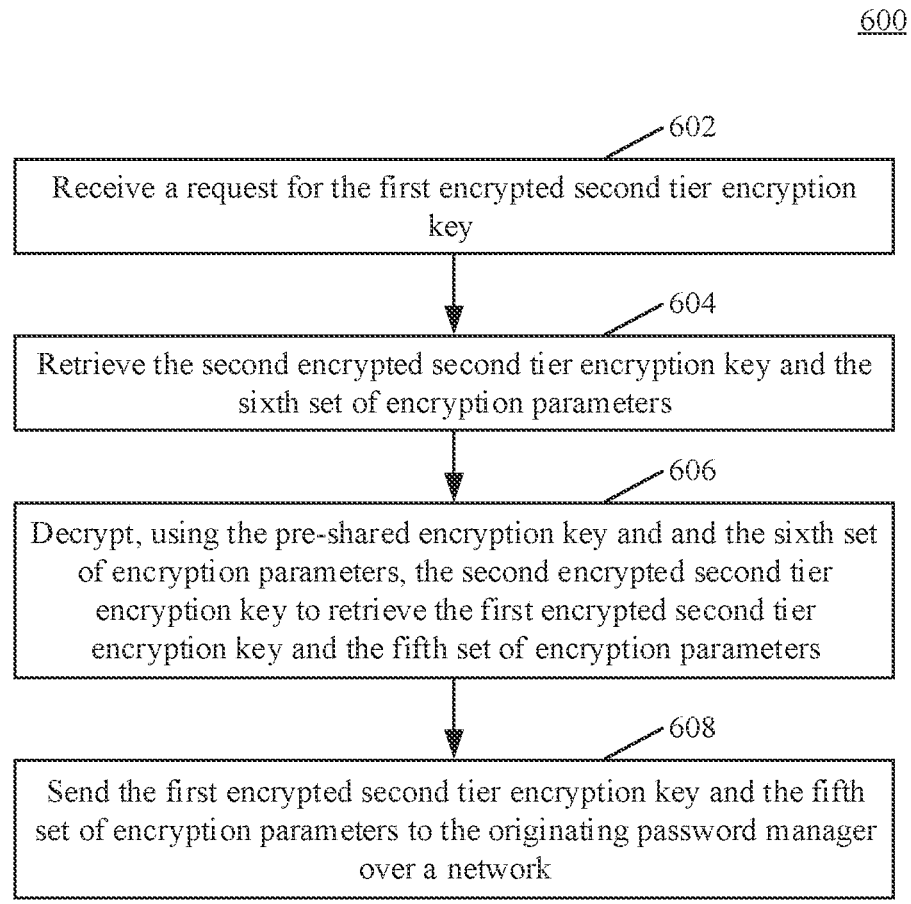
FIG. 9 is a flowchart illustrating a process by which an improved password manager retrieves and sends back a first encrypted second tier encryption key to the originating electronic communication device in accordance with this disclosure.

Referring to FIG. 9, a flowchart illustrating a process by which the improved password manager 140 running on the trusted partner communication device 106 retrieves and sends back the first encrypted second tier encryption key to the improved password manager running on the device 104 is shown and generally indicated at 600. At 602, the improved password manager 140 receives the request for the first encrypted second tier encryption key from the improved password manager running on the device 104. At 604, the improved password manager 140 retrieves the stored second encrypted second tier encryption key and the sixth set of encryption parameters. At 606, the improved password manager 140 decrypts, using the pre-shared encryption key and the sixth set of encryption parameters, the second encrypted second tier encryption key to retrieve the first encrypted second tier encryption key and the fifth set of encryption parameters. At 608, the improved password manager 140, running on the trusted electronic communication device 106, sends the recovered first encrypted second tier encryption key and the fifth set of encryption parameters back to the improved password manager 140 running on the trusted electronic communication device 104.

Figure 10:
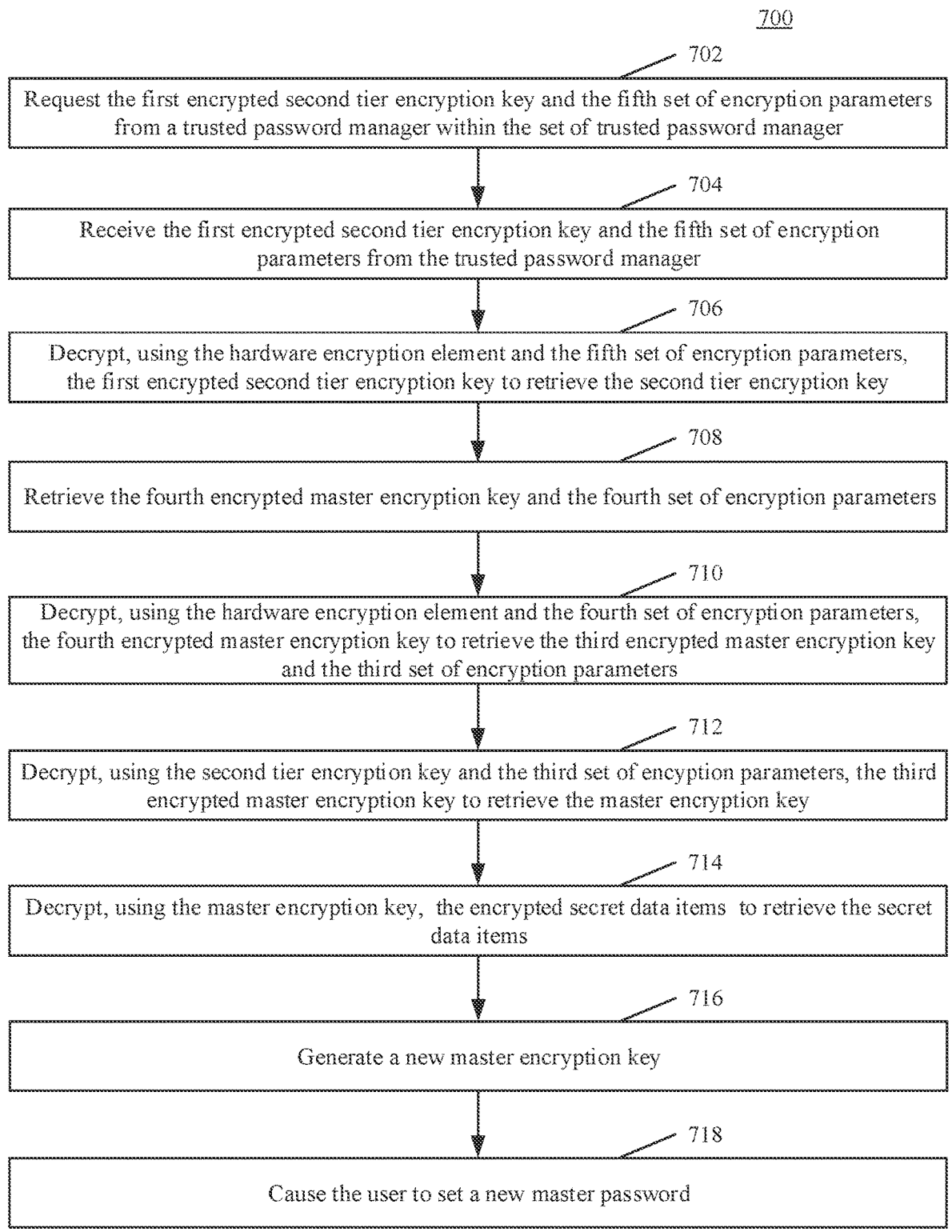
FIG. 10 is a flowchart illustrating a process by which an improved password manager retrieves plain secret data items from the encrypted secret data without the master password in accordance with this disclosure.

The process by which the improved password manager 140, running on the electronic communication device 104, retrieves the plain secret data items without the master password is further illustrated by reference to FIG. 10. Turning now to FIG. 10, a flowchart illustrating the process is shown and generally indicated at 700. At 702, the improved password manager 140 requests the first encrypted second tier encryption key and the fifth set of encryption parameters from the trusted improved password manager running on the trusted user's trusted electronic communication device. It is sent back at 608. The request can be, for example, a message sent over the network 102.

At 704, the improved password manager 140 receives the first encrypted second tier encryption key and the fifth set of encryption parameters from the trusted password manager. At 706, the improved password manager 140 decrypts, using the hardware encryption element 122 with the fifth set of encryption parameters, to decrypt the first encrypted second tier encryption key to retrieve the second tier encryption key. At 708, the improved password manager 140 retrieves the stored fourth encrypted master encryption key and the fourth set of encryption parameters. At 710, the improved password manager 140 decrypts, using the hardware encryption element 122 and the fourth set of encryption parameters, the fourth encrypted master encryption key to retrieve the third encrypted master encryption key and the third set of encryption parameters. At 712, the improved password manager 140 decrypts, using the second tier encryption key and the third set of encryption parameters, the third encrypted master encryption key to retrieve the master encryption key. At 714, the improved password manager 140 decrypts, using the master encryption key, encrypted secret data items to retrieve the secret data items.

Once the secret data items have been recovered with the user having lost the master password, at 716, the improved password manager 140 generates a new master encryption key for further encrypting the user's data. Furthermore, at 718, the improved password manager 140 causes the user to set a new master password. For example, the improved password manager 140 provides a user interface allowing the user to reset a new master password.

The processes 400, 500 and 600 can be performed multiple times such that the improved password manager 140 running on the device 104 uses multiple trusted users and their trusted devices (such as 106-108) for assisting recovering the plain secret data items when the user loses her/his master password. In such a case, the multiple second tier encryption keys form a set of second tier encryption keys. The multiple second tier encryption keys can be different from each other for increased security. Each second tier encryption key corresponds to a unique trusted device. When more than one trusted password managers are used, the password manager 140 running on the device 104 can recover the secret data items even if only one of them provides one first encrypted second tier encryption key. Accordingly, multiple trusted password managers significantly increase the availability of the system.

The improved password manager 140 does not store the master password, the encryption key, the master encryption key or any second tier encryption key within the set of second tier encryption keys. Neither the master password nor the master encryption key is shared with the trusted electronic communication devices, such as the devices 106-108.

Obviously, many additional modifications and variations of the present disclosure are possible in light of the above teachings. Thus, it is to be understood that, within the scope of the appended claims, the disclosure may be practiced otherwise than is specifically described above.

The foregoing description of the disclosure has been presented for purposes of illustration and description, and is not intended to be exhaustive or to limit the disclosure to the precise form disclosed. The description was selected to best explain the principles of the present teachings and practical application of these principles to enable others skilled in the art to best utilize the disclosure in various embodiments and various modifications as are suited to the particular use contemplated. It should be recognized that the words "a" or "an" are intended to include both the singular and the plural. Conversely, any reference to plural elements shall, where appropriate, include the singular.

It is intended that the scope of the disclosure not be limited by the specification, but be defined by the claims set forth below. In addition, although narrow claims may be presented below, it should be recognized that the scope of this invention is much broader than presented by the claim(s). It is intended that broader claims will be submitted in one or more applications that claim the benefit of priority from this application. Insofar as the description above and the accompanying drawings disclose additional subject matter that is not within the scope of the claim or claims below, the additional inventions are not dedicated to the public and the right to file one or more applications to claim such additional inventions is reserved.

What is claimed is:

1. A method for decrypting encrypted secret data items without compromised security while a master password becomes unavailable, said method performed by a password manager running on an electronic communication device and comprising:
   1) retrieving a master password,
   2) deriving, using a key derivation function, an encryption key from said master password;
   3) generating a master encryption key;
   4) encrypting, using said encryption key and a first set of encryption parameters, said master encryption key to generate a first encrypted master encryption key;
   5) encrypting, using a hardware encryption element of said electronic communication device and a second set of encryption parameters, said first encrypted master encryption key and said first set of encryption parameters to generate a second encrypted master encryption key;
   6) storing said second encrypted master encryption key and said second set of encryption parameters;
   7) generating a second tier encryption key;
   8) encrypting, using said second tier encryption key and a third set of encryption parameters, said master encryption key to generate a third encrypted master encryption key;
   9) encrypting, using said hardware encryption element and a fourth set of encryption parameters, said third encrypted master encryption key to generate a fourth encrypted master encryption key,
   10) storing, said fourth encrypted master encryption key and said fourth set of encryption parameters;
   11) encrypting, using said hardware encryption element and a fifth set of encryption parameters, said second tier encryption key to generate a first encrypted second tier encryption key;
   12) encrypting, using a pre-shared encryption key and a sixth set of encryption parameters, said first encrypted second tier encryption key and said fifth set of encryption parameters to generate a second encrypted second tier encryption key;
   13) sending said second encrypted second tier encryption key and said sixth set of encryption parameters to a trusted password manager running on a second electronic communication device over a network;
   14) requesting said first encrypted second tier encryption key and said fifth set of encryption parameters from said trusted password manager;
   15) receiving said first encrypted second tier encryption key and said fifth set of encryption parameters from said trusted password manager;
   16) decrypting, using said hardware encryption element and said fifth set of encryption parameters, said first encrypted second tier encryption key to retrieve said second tier encryption key;
   17) retrieving said fourth encrypted master encryption key and said fourth set of encryption parameters;
   18) decrypting, using said hardware encryption element and said fourth set of encryption parameters, said fourth encrypted master encryption key to retrieve said third encrypted master encryption key and said third set of encryption parameters;
   19) decrypting, using said second tier encryption key and said third set of encryption parameters, said third encrypted master encryption key to retrieve said master encryption key; and
   20) decrypting, using said master encryption key, said encrypted secret data items to retrieve secret data items, wherein said electronic communication device having:
      a) a processing unit:
      b) a memory operatively coupled to said processing unit;
      c) a network interface operatively coupled to said processing unit;
      d) a video output interface operatively coupled to said processing unit;
      e) a hardware security element operatively coupled to said processing unit; and
      f) a storage element operatively coupled to said processing unit.

2. The method of claim 1 wherein:
1) said key derivation function is a Password-Based Key Derivation Function 2 function or an Argon2 function;
2) said encryption key is an Advanced Encryption Standard (AES) 128-bit key, an AES 192-bit key or an AES 256-bit key;
3) said master encryption key is an AES 128-bit key, an AES 192-bit key or an AES 256-bit key; and
4) said hardware encryption element is a Secure Element, wherein said Secure Element is a microprocessor chip of said electronic communication device.

3. The method of claim 2 wherein:
1) said first set of encryption parameters includes a first initialization vector;
2) said second set of encryption parameters includes a second initialization vector;
3) said third set of encryption parameters includes a third initialization vector;
4) said fourth set of encryption parameters includes a fourth initialization vector;
5) said fifth set of encryption parameters includes a fifth initialization vector; and
6) said sixth set of encryption parameters includes a sixth initialization vector.

4. The method of claim 2 wherein said second encrypted master encryption key, said second set of encryption parameters, said fourth encrypted master encryption key and said fourth set of encryption parameters are stored into said storage element.

5. The method of claim 4 further comprising generating a new master encryption key.

6. The method of claim 5 further comprising causing a new master password generated.

7. The method of claim 2 further comprising:
1) Sending said second encrypted second tier encryption key and said sixth set of encryption parameters to a second trusted password manager running on a third electronic communication device over a network; and
2) Requesting said first encrypted second tier encryption key and said fifth set of encryption parameters from said second trusted password manager.

8. The method of claim 7 further comprising receiving said first encrypted second tier encryption key and said fifth set of encryption parameters from said second trusted password manager.

9. The method of claim 1 further comprising generating a new master encryption key.

10. The method of claim 9 further comprising causing a new master password generated.

11. The method of claim 1 further comprising:
1) Sending said second encrypted second tier encryption key and said sixth set of encryption parameters to a second trusted password manager running on a third electronic communication device over a network; and
2) Requesting said first encrypted second tier encryption key and said fifth set of encryption parameters from said second trusted password manager.

12. The method of claim 11 further comprising receiving said first encrypted second tier encryption key and said fifth set of encryption parameters from said second trusted password manager.

13. The method of claim 1 wherein said key derivation function is a Password-Based Key Derivation Function 2 function or an Argon2 function.

14. The method of claim 1 wherein said encryption key is an Advanced Encryption Standard (AES) 128-bit key, an AES 192-bit key or an AES 256-bit key.

15. The method of claim 1 wherein said master encryption key is an Advanced Encryption Standard (AES) 128-bit key, an AES 192-bit key or an AES 256-bit key.

16. The method of claim 1 wherein said hardware encryption element is a Secure Element, wherein said Secure Element is a microprocessor chip of said electronic communication device.

17. The method of claim 1 wherein at least one of said first set of encryption parameters, said second set of encryption parameters, said third set of encryption parameters, said fourth set of encryption parameters, said fifth set of encryption parameters, and said sixth set of encryption parameters includes an initialization vector.

18. The method of claim 1 wherein said first set of encryption parameters, said second set of encryption parameters, said third set of encryption parameters, said fourth set of encryption parameters, said fifth set of encryption parameters, and said sixth set of encryption parameters each include a respective initialization vector.

19. The method of claim 1 wherein said second encrypted master encryption key, said second set of encryption parameters, said fourth encrypted master encryption key and said fourth set of encryption parameters are stored into said storage element.

* * * * *